(12) United States Patent
Kuno

(10) Patent No.: US 7,314,846 B2
(45) Date of Patent: Jan. 1, 2008

(54) METHOD FOR PREPARING METAL OXIDE PARTICLES AND AN EXHAUST GAS PURIFYING CATALYST

(75) Inventor: Oji Kuno, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 140 days.

(21) Appl. No.: 10/690,240

(22) Filed: Oct. 22, 2003

(65) Prior Publication Data

US 2004/0087440 A1    May 6, 2004

(30) Foreign Application Priority Data

Oct. 28, 2002    (JP)    ............................. 2002-312744

(51) Int. Cl.
*B01J 23/00* (2006.01)
*B01J 23/02* (2006.01)
*B01J 23/10* (2006.01)
*B01J 23/40* (2006.01)
*B01J 21/04* (2006.01)

(52) U.S. Cl. ...................... 502/326; 502/304; 502/339; 502/349; 502/439

(58) Field of Classification Search ................ 502/304, 502/326, 339, 349, 439
See application file for complete search history.

(56) References Cited

U.S. PATENT DOCUMENTS

| | | | | |
|---|---|---|---|---|
| 4,851,293 A | * | 7/1989 | Egerton et al. ............. 428/403 |
| 5,139,992 A | * | 8/1992 | Tauster et al. ............. 502/304 |
| 5,206,192 A | * | 4/1993 | Dransfield et al. .......... 501/103 |
| 5,212,142 A | * | 5/1993 | Dettling ...................... 502/304 |
| 5,254,519 A | * | 10/1993 | Wan et al. ................... 502/252 |
| 5,283,041 A | * | 2/1994 | Nguyen et al. .......... 423/240 S |
| 5,491,120 A | * | 2/1996 | Voss et al. ................... 502/304 |
| 5,578,283 A | * | 11/1996 | Chen et al. ............. 423/240 R |
| 5,607,892 A | * | 3/1997 | Chopin et al. .............. 502/304 |
| 5,693,299 A | | 12/1997 | Chopin et al. |
| 5,888,464 A | * | 3/1999 | Wu et al. ................. 423/213.5 |
| 5,945,369 A | * | 8/1999 | Kimura et al. .............. 502/304 |
| 5,958,827 A | * | 9/1999 | Suda et al. .................. 502/304 |
| 5,972,830 A | * | 10/1999 | Yoshida et al. ............. 502/304 |

(Continued)

FOREIGN PATENT DOCUMENTS

EP    1 035 074 A1    9/2000

(Continued)

OTHER PUBLICATIONS

A. F. Holleman et al., "Lehrbuch der Anorganischen Chemie", 1995, p. 929.

*Primary Examiner*—Cam N. Nguyen
(74) *Attorney, Agent, or Firm*—Oliff & Berridge, PLC

(57) ABSTRACT

The present invention relates to metal oxide particles having cores comprising larger molar amounts of zirconia than of ceria, and surface layers comprising larger molar amounts of ceria than of zirconia. Further, the present invention relates to a method for preparing the particles. The method comprises preparing a solution comprising zirconia sol and ceria sol, adjusting the pH of the solution within ±0.5 on the basis of the isoelectric point of zirconia, and aggregating zirconia and then aggregating ceria around the aggregated zirconia from the solution to make aggregates. Furthermore, the present invention relates to an exhaust gas purifying catalyst comprising the metal oxide particles, and a noble metal carried by the metal oxide particles.

18 Claims, 1 Drawing Sheet

U.S. PATENT DOCUMENTS

| | | | |
|---|---|---|---|
| 6,030,914 A * | 2/2000 | Matsui .................... 501/103 |
| 6,171,572 B1 * | 1/2001 | Aozasa ................ 423/594.12 |
| 6,177,381 B1 * | 1/2001 | Jensen et al. ............... 502/325 |
| 6,191,061 B1 * | 2/2001 | Takada et al. ................ 502/66 |
| 6,214,306 B1 * | 4/2001 | Aubert et al. ............ 423/213.2 |
| 6,228,799 B1 * | 5/2001 | Aubert et al. ............... 502/304 |
| 6,255,242 B1 | 7/2001 | Umemoto et al. |
| 6,261,989 B1 * | 7/2001 | Tanaka et al. ............... 502/217 |
| 6,306,794 B1 * | 10/2001 | Suzuki et al. ............... 502/304 |
| 6,335,305 B1 * | 1/2002 | Suzuki et al. ............... 502/325 |
| 6,358,880 B1 * | 3/2002 | Hedouin et al. ............ 502/302 |
| 6,464,946 B1 * | 10/2002 | Yamada et al. ............. 422/177 |
| 6,492,297 B1 * | 12/2002 | Sung .......................... 502/304 |
| 6,492,298 B1 * | 12/2002 | Sobukawa et al. .......... 502/325 |
| 6,528,451 B2 * | 3/2003 | Brezny et al. ............... 502/304 |
| 6,576,200 B1 * | 6/2003 | Yamamoto et al. ......... 422/177 |
| 6,645,439 B2 * | 11/2003 | Zhang et al. ................ 422/177 |
| 6,682,706 B1 * | 1/2004 | Yamamoto et al. ......... 422/180 |
| 6,762,147 B2 * | 7/2004 | Morikawa et al. .......... 502/242 |
| 6,797,668 B2 * | 9/2004 | Yoshikawa .................. 502/304 |
| 6,831,036 B1 * | 12/2004 | Yamazaki et al. .......... 502/327 |
| 6,875,408 B1 * | 4/2005 | Yamamoto et al. ......... 422/180 |
| 6,893,998 B2 * | 5/2005 | Shigapov et al. ........... 502/327 |
| 6,911,414 B2 * | 6/2005 | Kimura et al. .............. 502/349 |
| 7,052,777 B2 * | 5/2006 | Brotzman et al. .......... 428/570 |
| 2003/0083194 A1 * | 5/2003 | Sung .......................... 502/304 |
| 2005/0059547 A1 | 3/2005 | Kuno |

FOREIGN PATENT DOCUMENTS

| | | |
|---|---|---|
| EP | 1 516 855 A1 | 3/2005 |
| JP | 06-279027 | 10/1994 |
| JP | A 8-103650 | 4/1996 |
| JP | A 8-109020 | 4/1996 |
| JP | A 8-109021 | 4/1996 |
| JP | A 2000-319019 | 11/2000 |
| JP | A 2001-89143 | 4/2001 |

\* cited by examiner

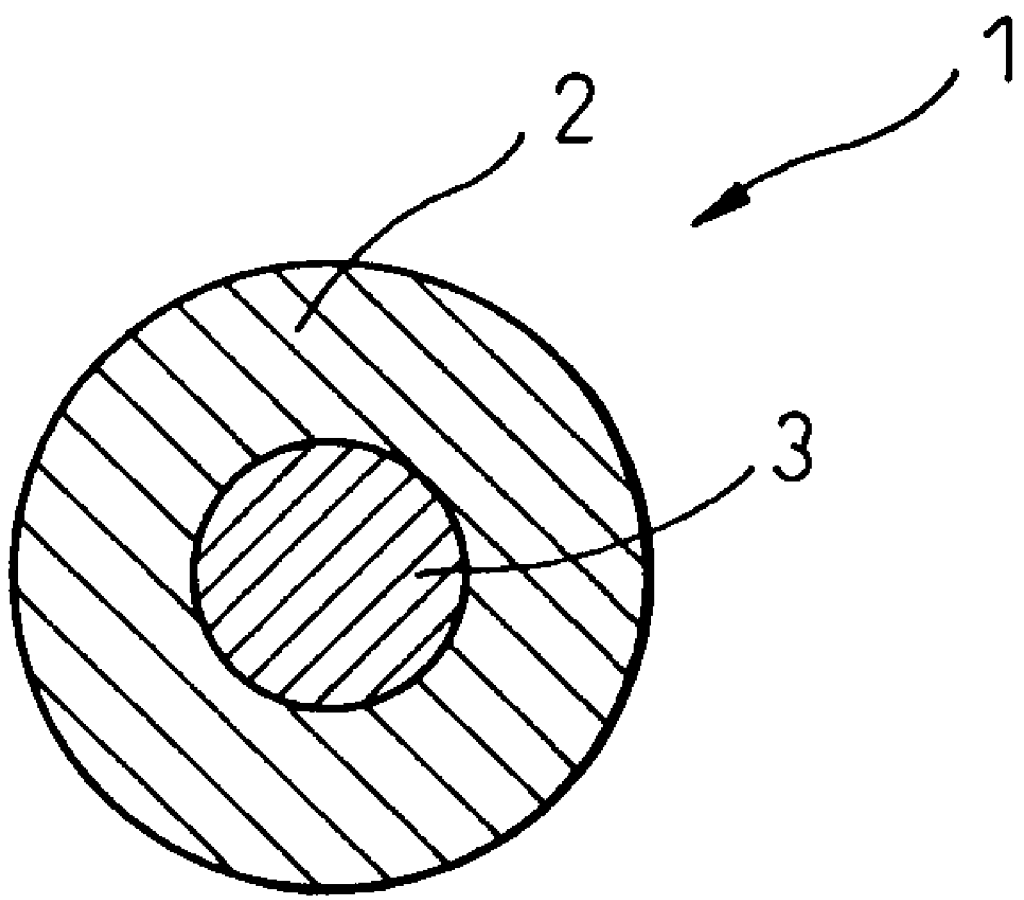

METHOD FOR PREPARING METAL OXIDE PARTICLES AND AN EXHAUST GAS PURIFYING CATALYST

BACKGROUND OF THE INVENTION

1. Field of the Invention

The present invention relates to a catalyst for purifying the contents of exhaust gas from an internal combustion engine, and metal oxide particles suitable as a carrier for an exhaust gas purifying catalyst and a method for preparing this.

2. Description of the Related Art

Exhaust gas from an internal combusting engine such as an automobile engine comprises nitrogen oxide ($NO_x$), carbon monoxide (CO), hydrocarbon (HC) and etc. These contents of the exhaust gas can be purified by the use of an exhaust gas purifying catalyst which oxidizes CO and HC while reduce $NO_x$. A representative exhaust gas purifying catalyst includes a three way catalyst which comprises porous metal oxide carrier such as γ-alumina and a noble metal such as platinum (Pt), Rhodium (Rh) and/or Palladium (Pd) carried thereon.

It is necessary that an internal combustion engine is driven at stoichiometric air/fuel ratio (stoichiometry) in order for the three way catalyst to achieve effective oxidation of CO and HC as well as reduction of $NO_x$. In the case that the internal combustion engine is driven at excess oxygen atmosphere (lean) or at excess fuel atmosphere (rich), the three-way catalyst cannot demonstrate its purification ability as the oxygen concentration in the exhaust gas becomes outside the range of the optimum oxygen concentration for the three-way catalyst.

It is well known that a material having an oxygen storage capacity (OSC) is used with an exhaust gas purifying catalyst. OSC means a capacity enabling storing oxygen at the high oxygen concentration and releasing oxygen at the low oxygen concentration. OSC is useful to buffer the change of oxygen concentration in exhaust gas and thereby enhances the exhaust gas purifying ability of the three way catalyst. A representative material having OSC is ceria ($CeO_2$). Ceria has not only OSC but also large affinity with noble metal carried thereon. Therefore, the ceria is also useful to prevent particle growth (sintering) of the noble metal carried thereon. Methods for preparing mixed metal oxide of ceria and zirconia have been developed to provide materials having high heat resistivity as ceria has small specific surface area and low heat resistivity. Regarding the prior arts, refer to Japanese Unexamined Patent Publication No. 8-103650, 8-109020, 8-109021, 2000-319019, 2001-89143 and etc.

According to the prior arts, as both ceria and zirconia exist on the surface of the mixed metal oxide comprising uniformly mixed ceria and zirconia, a noble metal carried by the mixed metal oxide randomly deposits on both ceria and zirconia surface. Therefore, in the prior arts, there is a problem that an affinity between the mixed metal oxide and noble metal is lowered, the noble metal is sintered and, then, the catalyst loses its ability to purify exhaust gas.

That is, the previous catalysts comprising a cerium-zirconium mixed metal oxide lose OSC, and an ability to purify exhaust gas, by the sintering of noble metal on their surface, particularly when they are exposed to a high temperature of 1000° C. or more for a long time.

Therefore, there remains a need for an exhaust gas purifying catalyst which maintains a heat resistivity of mixed metal oxide, has high affinity to a noble metal to maintain OSC, and only slightly lose its ability to purify exhaust gas after being exposed to a high temperature. Further, there remains a need for a method for preparing a metal oxide suitable for the exhaust gas purifying catalyst.

BRIEF SUMMARY OF INVENTION

In one aspect, the present invention is an exhaust gas purifying catalyst. The exhaust gas purifying catalyst comprises metal oxide particles comprising ceria and zirconia; and noble metal carried by the metal oxide particles, wherein the metal oxide particles have cores comprising larger molar amounts of zirconia than of ceria, and surface layers comprising larger molar amounts of ceria than of zirconia. The exhaust gas purifying catalyst may then have a superior heat resistivity and a superior ability to purify exhaust gas after enduring test at high temperature.

The metal oxide particles may have a mean particle diameter of 500 nm or less, 200 nm or less, 100 nm or less, or 50 nm or less, with 50 nm or less being preferred.

The catalyst may be used for purifying exhaust gas from an internal combustion engine such as an automobile engine.

The catalyst may be used at the temperature of 1,000° C. or more.

The molar ratio of Zr:Ce in the metal oxide particles may be 1:0.5 to 0.5:1, 1:0.8 to 0.8:1, or about 1:1, with about 1:1 being preferred.

The metal oxide particles may further comprise one or more metal oxides other than ceria and zirconia.

The molar ratio of (Zr and Ce):(the other metals) may be 5:1 to 20:1, 8:1 to 10:1, or about 9:1.

The ceria may cover more than 80 mol %, 90 mol %, 95 mol % or 98 mol % of the surfaces of the metal oxide particles, and preferably substantially all of the metal oxide surface, as measured by the transmission electron microscope (TEM) and energy dispersive X-ray analyzer (EDX).

The zirconia may form more than 80 mol %, 90 mol %, 95 mol % or 98 mol % of the cores of metal oxide particles, and preferably substantially all of the cores, as measured by the transmission electron microscope (TEM) and energy dispersive X-ray analyzer (EDX).

In another aspect, the present invention is metal oxide particles having cores comprising larger molar amounts of zirconia than of ceria, and surface layers comprising larger molar amounts of ceria than of zirconia.

The metal oxide particles may carry a noble metal.

In another aspect, the present invention is a method for preparing metal oxide particles in which the metal oxide particles have cores comprising larger molar amounts of zirconia than of ceria, and surface layers comprising larger molar amounts of ceria than of zirconia. The method comprises preparing a solution comprising zirconia sol and ceria sol, adjusting the pH of the solution within ±0.5 on the basis of the isoelectric point of zirconia, and aggregating a zirconia and then aggregating ceria around the aggregated zirconia from the solution to make aggregates. According the method, the metal oxide particles of the present invention are easily prepared, and the prepared metal oxide particles may have a very small mean particle diameter and large specific surface area.

The metal oxide particles may have a mean particle diameter of 500 nm or less, 200 nm or less, 100 nm or less, or 50 nm or less, with 50 nm or less being preferred.

The molar ratio of Zr:Ce in the metal oxide particles may be 1:0.5 to 0.5:1, 1:0.8 to 0.8:1, or about 1:1, with about 1:1 being preferred.

These and other objects, feature and advantages of the present invention will become apparent upon reading of the following detailed description along with the accompanied drawings.

BRIEF DESCRIPTION OF DRAWING

FIG. 1 is a schematic sectional view of the metal oxide particle of the present invention that can be used for a catalyst of the present invention. However, it is not necessary for the core 2 and surface layer 3 to be adjacent.

DETAILED DESCRIPTION OF INVENTION

The inventor of the present invention found that an exhaust gas purifying catalyst comprising metal oxide particles 1 having zirconia-rich core 2 and ceria-rich surface layer 3, and a noble metal carried by the metal oxide particles, shows an improved ability to purify exhaust gas even after an endurance test, and conceived the catalyst of the present invention.

The inventor of the present invention found that the metal oxide particles can be prepared by preparing a solution comprising zirconia sol and ceria sol, adjusting the pH of the solution around the isoelectric point of zirconia, aggregating and precipitating a metal oxide from the solution, and firing the aggregate. Thus prepared metal oxide particles have zirconia-rich core and ceria-rich surface layers, and very small particle sizes.

The exhaust gas purifying catalyst according to the present invention comprises metal oxide particles as a substrate and a noble metal carried thereby, and is characterized in that the metal oxide particles have cores comprising larger molar amounts of zirconia than of ceria and surface layers comprising larger molar amounts of ceria of zirconia.

It is also possible to prepare metal oxide particles having cores comprising larger molar amounts of zirconia than of ceria and surface layers comprising larger molar amounts of ceria than of zirconia by a method comprising mixing zirconia particle and ceria sol, aggregating ceria around the zirconia particle and firing it. However, zirconia particles used in this method generally have a mean diameter of a few micrometers or more and, then, the metal oxide particles obtained by aggregating ceria around the zirconia particles and firing it also have a mean particle diameter of a few micrometer or more. The large particles comprising ceria and zirconia such as particles having a mean particle diameter of a few micrometer or more hardly improves the heat resistivity of ceria for OSC (effect of improving heat resistivity) provided by a cerium-zirconium mixed metal oxide, even if the metal oxide particles comprise ceria and zirconia.

The method for preparing metal oxide particle of the present invention comprises adjusting a pH of the solution comprising zirconia sol and ceria sol to around the isoelectric point of zirconia sol, and aggregating the sols into metal oxide particles. The metal oxide particles prepared by this method are very small, have large specific surface areas, and provide an effect of improving the heat resistively of ceria by the use of zirconia.

The method for preparing metal oxide particles of the present invention is further described at the following. The term "sol" in the zirconia sol or ceria sol means a colloid of metal oxide or metal hydride dispersed in liquid, especially water. Zirconia or ceria may be provided by removing liquid from sol and being fired. For example, the zirconia sol or ceria sol may be obtained by hydrating or condensing alkoxide, acetylacetonate, acetate, nitrate and etc. of zirconium or cerium in a solution. A zirconia sol and ceria sol are well known and commercially available.

Although the method of the present invention uses a solution comprising zirconia sol and ceria sol as raw material, the solution may further comprise salt and/or sol of metals other than Ce and Zr, and any the other material. The metals other than Ce and Zr may be selected from the group consisting of s-block metals, d-block metals, p-block metals, and f-block metals. More specially, the metals other than Ce and Zr include Na, K, Mg, Ca, Ba, Sr, La, Y, Pr, Nd, Sm, Eu, Gd, Ti, Sn, Mn, Fe, Co, Ni, Cr, Nb, Cu, V, Mo, W, Zn, Al, Si and Ta. Preferably, the metals other than Ce and Zr include rare earth metals such as one or more metals selected from the group consisting of La, Y, Pr, Nd, Sm, Eu and Gd, especially one or more metals selected from the group consisting of La, Y and Pr.

Specially, a metal salt such as lanthanum nitrate and praseodymium nitrate, and/or sol compound such as yttria sol may be add to zirconia sol and ceria sol. A metal oxide formed from raw material comprising salt and/or sol of rare earth metal has high heat resistivity and shows a small reduction of OSC after being exposed to a high temperature.

The mixing ratio of zirconia sol, ceria sol, and salt and/or sol of the other metals may be optionally determined. It is, however, preferable to use about the same amounts of Zr and Ce (e.g. molar ratio of Zr:Ce:the other metals is 45:45:10) in order to maintain heat resistivity.

According to the method for preparing metal oxide of the present invention, the pH of the solution comprising zirconia sol and ceria sol ("raw sol solution") is adjusted to about the isoelectric point of zirconia, and aggregates sols into particles.

The isoelectric point of zirconia can be determined by a stopwatch method which belongs to an electrophoresis-microscope method (c.f. JIS (Japanese Industrial Standard) R1638). The isoelectric point of the zirconia may be determined for zirconia obtained by drying and firing the raw zirconia sol of same lot as the zirconia sol to be used in examples.

The pH of the raw material may be adjusted by addition of any kind of acid or base, with mineral acid such as nitric acid and/or hydrogen chloride being preferred as an acid, and aqueous ammonia and/or sodium hydroxide being preferred as a base. A commercially available metal oxide sol solution has a pH that rather differs from the isoelectric point of zirconia sol in order to prevent aggregation, precipitation and solution of metal oxide sol. Therefore, an acid is generally added to a basic zirconia sol solution for the method of the present invention.

It is most preferable to precisely adjust the pH of a raw sol solution to the isoelectric point of zirconia, but it is practically very difficult. Therefore, it is preferable to adjust the pH of the raw sol solution within ±0.5, more preferably within ±0.2 on the basis of the isoelectric point of the zirconia sol. The pH of the raw sol solution may be adjusted by adding an acid or a base to the raw sol solution while measuring pH of the raw sol solution by a pH meter. Alternatively, the pH of the raw sol solution may be adjusted by sampling the raw sol solution to predetermine an amount of acid or base required for adjusting pH of the raw sol solution, and then adding the predetermined amount of acid or base to the bulk raw sol solution.

A solvent for a raw sol solution is generally water, and may comprise an organic solvent such as alcohol and acetlyacetone, if required. The solvent may be removed and dried out from a raw sol solution by any method and at any temperature, e.g. the solvent may be removed and dried out by introducing the raw sol solution into an oven at the temperature of 120° C.

Metal oxide particles may be prepared by removing solvent from a raw sol solution and firing the dried raw material. The firing step may be performed at a temperature generally used for metal oxide synthesis, e.g. 500° C. or more such as 500 to 1,000° C.

The metal oxide particles prepared by the method of the present invention have rather smaller diameters and larger specific surface areas than those prepared by the well method wherein sintered metal oxide is milled. Therefore, the metal oxide particles prepared by the method of the present invention can carry a noble metal in a highly dispersed manner. The metal oxide particles prepared by the present invention has a diameter of 50 nm or less when a sol having a mean diameter of about 5 nm is used as a raw material, while metal oxide particles prepared by milling a bulk metal oxide have mean particle diameters of 1 μm or more.

The metal oxide particles prepared by the method of the present invention have cores comprising a larger molar amounts of zirconia than of ceria, and surface layers comprising larger molar amounts of ceria than of zirconia. In fact, the metal oxide particle prepared by the following examples has about same isoelectric point about as that of ceria. Therefore, it is deemed that the ceria covers substantially all the surface of the metal oxide particle. The Ce and Zr distribution within the metal oxide particle obtained by the transmission electron microscope (TEM) and energy dispersive X-ray analyzer (EDX) shows that almost all metal elements at the surfaces of the particles are Ce and that almost all metal elements at the cores of the particles are Zr.

It is deemed that the method of the present invention provides a metal oxide particles having zirconia-rich cores and ceria-rich surface layers for the following reasons:

At the isoelectric point of the zirconia, zirconia particles tend to aggregate since a zeta potential at the surface of the zirconia particles become zero, and the surfaces of the zirconia particles are electrically neutral and do not have electrical charge. At the isoelectric point of the zirconia, ceria has a positive zeta potential and positive electrical charge since ceria has higher isoelectric point than zirconia. Therefore, when the pH of a solution comprising ceria sol and zirconia sol is adjusted to the isoelectric point of zirconia, zirconia having neutral electrical potential tends to aggregate and ceria having positive potential does not tend to aggregate. At this situation, firstly zirconia is aggregated and then ceria is aggregated around the aggregated zirconia cores when the metal oxide particles are aggregated, e.g. by concentrating the solution. Therefore, the metal oxide particles prepared by the method of the present invention have zirconia-rich cores and ceria-rich surface layers.

An exhaust gas purifying catalyst may be prepared by carrying a noble metal on the above metal oxide particles. The noble metal may be carried on metal oxide particles by the any method, e.g. by soaking an aqueous solution of salt and/or complex of noble metal into the metal oxide particles, and then drying and firing the metal oxide particles. It is preferable that the metal oxide particles carry one or more noble metals selected from the group consisting of Pt, Pd, Rh, Ir and Au, more preferably one or more noble metals having high exhaust gas purification ability selected from the group consisting of Pt, Pd and Rh, even more preferably Pt. It is preferable that the metal oxide particles carry a noble metal at an amount of 0.01 to 5 wt %, more preferably 0.1 to 2 wt % on the basis of the amount of the metal oxide particles. The exhaust gas purification ability is not sufficient when the noble metal carried by the metal oxide particles is less than 0.01 wt %, while cost is increased though the exhaust gas purification ability is saturated when the noble metal carried by metal oxide particles is more than 5 wt %.

Because the metal oxide particles prepared by the method of the present invention have very small particle diameters and large specific surface areas, the noble metal carried thereon can be well-dispersed and has a small particle diameter.

The exhaust gas purifying catalyst of the present invention has a superior ability for exhaust gas purification after a high temperature endurance test and a superior heat resistivity relative to the exhaust gas purifying catalyst comprising the noble metal carried on the metal oxide particles composed of equally dispersed ceria and zirconia.

The exhaust gas purifying catalyst of the present invention is very useful for purifying an exhaust gas from an internal combustion engine such as automobile engine. The method for preparing a metal oxide particles of the present invention is very useful for preparing metal oxide particles used for an exhaust gas purifying catalyst.

The exhaust gas purifying catalyst of the present invention can be used in coatings on a monolithic substrate such as a ceramic honeycomb. The present invention is described, on the basis of examples, as follows.

EXAMPLES

The same zirconia sol as that used for following examples was dehydrated and dried to obtain $ZrO_2$. The isoelectric point of the obtained $ZrO_2$ was determined by the stopwatch method that is one of electrophoretic microscopy methods (JIS (Japanese Industrial Standard) R1638). It was shown that the $ZrO_2$ has an isoelectric point of pH 4.0. Therefore, in the following examples, the value of pH 4.0 was used as isoelectric point of $ZrO_2$.

In the following examples, the pH of the metal oxide sol solution is determined by a pH meter wherein the electrode of the pH meter is directly dipped into the metal oxide sol solution.

Example 1

Preparation of Catalyst 1

A zirconia sol comprising 10.2 wt % of $ZrO_2$ (TAKI CHEMICAL CO., LTD., ECOLIGHT) (111.76 g) and yttria sol comprising 15 wt % of $Y_2O_3$ (TAKI CHEMICAL CO., LTD., $Y_2O_3$ sol) (6 g) were added to a ceria sol comprising 15 wt % of $CeO_2$ (TAKI CHEMICAL CO., LTD., NEEDRAL U-15) (116 g), and mixed. The resulting sol mixture had a pH of 5.8.

An aqueous nitric acid was added to the sol mixture to adjust pH of the sol mixture to pH 4.0 that is the isoelectric point of the $ZrO_2$. The adjusted solution was dehydrated, and an resulting solid material was dried at 120° C. for 24 hours and then fired at 700° C. for 5 hours to obtain mixed metal oxide particles. The obtained mixed metal oxide particles had a specific surface area of 66.8 $m^2$/g. To the solution consisting of water particles (300 g) and the mixed metal oxide particles (30 g) dispersed therein, a platinum dinitrodiammine solution (6.82 g) comprising 4.4 wt % of Pt was added and stirred for two hours, and then the resulting mixture was dehydrated to obtain solid material. The obtained solid material was dried at 120° C. and then fired at 500° C. for two hours to obtain Catalyst 1. The Catalyst 1 had a weight ratio of $CeO_2:ZrO_2:Y_2O_3=58:38:4$. The Catalyst 1 consists of mixed metal oxide particles having a surface layer of $CeO_2$ and core of $ZrYO_x$, and Pt carried thereby. The amount of Pt carried by mixed metal oxide particles was 1 wt % on the basis of the weight of the mixed metal oxide particles.

Example 2

Preparation of Catalyst 2

Catalyst 2 was prepared according to the Example 1 except that ceria sol (193.33 g), zirconia sol (156.85 g), and aqueous solution (30 cc) comprising nitric lanthanum (3.99 g) and nitric praseodymium (8.94 g) in solution were used as the substitute for ceria sol (116 g), zirconia sol (111.76 g) and yttria sol (6 g). The obtained Catalyst 2 had a weight ratio of $CeO_2:ZrO_2:La_2O_3:Pr_6O_{11}=58:32:3:7$. The Catalyst 2 consists of mixed metal oxide particles having a surface layer of $CeO_2$ and Pt carried thereby. The amount of Pt carried by mixed metal oxide particles was 1 wt % on the basis of the weight of the mixed metal oxide particles. The mixed metal oxide had a specific surface area of 69.6 m$^2$/g before carrying Pt.

Comparative Example 1

Preparation of Catalyst 3

A same ceria sol (200 g) as that used in example 1 was dried at 120° C. The resulting solid material was fired at 700° C. for five hours to obtain $CeO_2$. The obtained $CeO_2$ had a specific surface area of 23.4 m$^2$/g. To the $CeO_2$ (30 g), water (300 g) and platinum dinitrodiammine solution (6.82 g) comprising 4.4 wt % of Pt were added, and stirred for two hours to obtain a mixture. The solid material obtained after drying this mixture at 120° C. was fired at 500° C. for two hours to obtain Catalyst 3.

Comparative Example 2

Preparation of Catalyst 4

Cerium nitrate (73.165 g), zirconium oxynitrate (41.16 g) and yttrium nitrate (6.48 g) was added to water (500 g), and mixed to obtain uniform solution. While the pH of the solution was measured by a pH meter, an aqueous ammonia was added to the solution to adjust pH of the solution to 9 and provide a precipitate. A solid material obtained after drying this solution at 120° C. was fired at 500° C. for two hours to obtain mixed metal oxide particles. To a solution comprising the mixed metal oxide particles (50 g) dispersed in water (300 g), platinum dinitrodiammine solution (11.36 g) comprising 4.4 wt % of Pt was added and stirred for two hours to obtain a mixture. This mixture was dried at 120° C., and fired at 500° C. for two hours to obtain Catalyst 4. The obtained Catalyst 4 had a weight ratio of $CeO_2:ZrO_2:Y_2O_3=58:38:4$. An amount of Pt carried by mixed metal oxide was 1 wt % on the basis of the weight of the mixed metal oxide particles.

Comparative Example 3

Preparation of Catalyst 5

A cerium nitrate (73.17 g), zirconium oxynitrate (34.66 g), lanthanum nitrate (3.99 g) and praseodymium nitrate (8.94 g) were added to water (500 g), and mixed to obtain uniform solution. While the pH of the solution was measured by a pH meter, aqueous ammonia was added to the solution to adjust pH of the solution to 9 and provide precipitate. A solid material obtained after drying this solution at 120° C. was fired at 700° C. for five hours to obtain mixed metal oxide particles. To this mixed metal oxide (30 g), water (300 g) and platinum dinitrodiammine solution (6.82 g) comprising 4.4 wt % of Pt were added and stirred for two hours to obtain a mixture. The solid material obtained after drying this mixture at 120° C. was fired at 500° C. for two hours to obtain Catalyst 5. The obtained Catalyst 5 had a weight ratio of $CeO_2:ZrO_2:La_2O_3:Pr_6O_{11}=58:32:3:7$. An amount of Pt carried on the mixed metal oxide particles was 1 wt % on the basis of the weight of the mixed metal oxide particles.

Evaluation of the Catalysts

The mean particle diameters of the mixed metal oxide particles prepared in above examples and comparative examples were determined by measuring particle diameters of the randomly sampled 100 particles by TEM and calculating mean values of the particle diameter for each examples and comparative examples.

1 mm square pellets made of Catalysts 1 to 5 in above examples and comparative examples were evaluated for exhaust gas purifying ability. Catalysts 1 to 5 were evaluated for specific surface area and particle size of Pt carried thereby. The specific surface area was evaluated by BET one point method. The diameter of the carried Pt was evaluated by CO pulse method. In the CO pulse method for determining Pt particle diameter, an amount of CO absorbed by $CeO_2$ family oxide before carrying Pt was deduced from an amount of CO absorbed by Catalysts 1 to 5 for CO pulse method as $CeO_2$ also has a CO absorbing ability.

A rich gas and a lean gas were used as a model exhaust gas for evaluating an exhaust gas purifying ability of catalyst. The compositions of the rich and lean gases are shown in table 1.

TABLE 1

| | $N_2$ (%) | $CO_2$ (%) | NO (ppm) | CO (%) | $C_3H_6$ (ppmC) *2 | $H_2$ (%) | $O_2$ (%) | $H_2O$ (%) |
|---|---|---|---|---|---|---|---|---|
| rich gas | balance *1 | 10 | 2200 | 2.80 | 2500 | 0.27 | 0.77 | 10 |
| lean gas | balance *1 | 10 | 2200 | 0.81 | 2500 | 0 | 1.7 | 10 |

*1 $N_2$ is the rest of the contents.
*2 The unit is based on an amount of carbon atoms.

Evaluation Procedure

Firstly, an enduring test was conducted wherein the catalysts were contacted with a model gas at 800° C. for five hours. The model gas consisted of the rich gas and lean gas which were switched every minute.

After enduring test, while rich and lean gases were switched at 1 Hz, the model gas was heated, and the temperature at which the $C_3H_6$ content in model gas after passing the catalyst was reduced to less than 50% was determined and considered as HC-T50(° C.). The lower the value of HC-T50(° C.), the higher the exhaust gas purification ability of the catalyst. The results obtained for Catalysts 1 to 5 are listed in table 2.

TABLE 2

| Catalyst to be evaluated (Ex. No.) | Metals whose oxides constitute catalysts *1 | Weight ratio of the oxide of above metal | Specific surface area (m²/g) | Mean particle size of mixed metal oxide (nm) | Particle size of Pt (nm) | HC-T50 (° C.) |
|---|---|---|---|---|---|---|
| Catalyst 1 (Example 1) | Ce/Zr/Y | 58/38/4 | 52 | 32 | 3.8 | 224 |
| Catalyst 2 (Example 2) | Ce/Zr/la/Pr | 58/32/3/7 | 59 | 26 | 3.2 | 222 |
| Catalyst 3 (Comparative Example 1) | Ce | 100 | 8 | 1260 | 6.2 | 325 |
| Catalyst 4 (Comparative Example 2) | Ce/Zr/Y | 58/38/4 | 36 | 325 | 9.3 | 298 |
| Catalyst 5 (Comparative Example 3) | Ce/Zr/la/Pr | 58/32/3/7 | 28 | 490 | 9.9 | 293 |

From the results listed in table 2, it is apparent that Catalyst 1 prepared in example 1 has a smaller Pt particle size, lower HC-50 value and superior ability as an exhaust gas purifying catalyst than Catalyst 4 prepared in comparative example 2 though Catalyst 1 has same composition as Catalyst 4. Further, it is apparent that Catalyst 2 prepared in example 2 has a smaller Pt particle size, lower HC-50 value and superior ability as an exhaust gas purifying catalyst than Catalyst 5 prepared in comparative example 3 though Catalyst 2 has same composition as Catalyst 5. Catalyst 3 prepared in comparative example 1 has a moderate Pt particle size among Catalysts 1 to 5, and large affinity between Pt and CeO₂. However, Catalyst 3 is not preferred, as an exhaust gas purifying catalyst, as Catalyst 3 has smaller specific surface area and lower heat resistivity of CeO₂, and also has largest HC-T50 value.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An exhaust gas purifying catalyst comprising:
   metal oxide particles comprising ceria and zirconia; and
   a noble metal carried by said metal oxide particles,
   wherein said metal oxide particles have cores comprising larger molar amounts of zirconia than of ceria, and surface layers comprising larger molar amounts of ceria than of zirconia.

2. The catalyst according to claim 1 wherein the metal oxide particles have a mean particle diameter of 500 nm or less.

3. The catalyst according to claim 1 for purifying exhaust gas from an internal combustion engine.

4. The catalyst according to claim 1 wherein the exhaust gas purifying catalyst is exposed to an environment having a temperature of 1,000° C. or more.

5. The catalyst according to claim 1 wherein the molar ratio of Zr:Ce in the metal oxide particles is 1:0.5 to 0.5:1.

6. The catalyst according to claim 1 further comprising one or more metal oxides other than ceria and zirconia.

7. The catalyst according to claim 6 wherein the molar ratio of (Zr and Ce):(the metal(s) of the one or more metal oxides other than ceria and zirconia) is 5:1 to 20:1.

8. The catalyst according to claim 1 wherein the ceria covers more than 80 mol % of the surface of the metal oxide particles, as measured by the transmission electron microscope and energy dispersive X-ray analyzer.

9. The catalyst according to claim 1 wherein the zirconia composes more than 80 mol % of the cores of metal oxide particles, as measured by the transmission electron microscope and energy dispersive X-ray analyzer.

10. The catalyst according to claim 1 wherein the metal oxide particles have a mean particle diameter of 50 nm or less.

11. Metal oxide particles having cores comprising larger molar amounts of zirconia than of ceria, and surface layers comprising larger molar amounts of ceria than of zirconia, wherein the metal oxide particles carry a noble metal.

12. A method for preparing metal oxide particles, with said metal oxide particles having cores comprising larger molar amounts of zirconia than of ceria, and surface layers comprising larger molar amounts of ceria than of zirconia, wherein the method comprises:
   preparing a solution comprising zirconia sol and ceria sol;
   adjusting the pH of the solution within ±0.5 on the basis of the isoelectric point of zirconia; and
   aggregating zirconia and then aggregating ceria around the aggregated zirconia from said solution to make aggregates.

13. The method according to claim 12 further comprising drying and firing the aggregates.

14. The method according to claim 12 wherein the metal oxide particles have a mean particle diameter of 500 nm or less.

15. The method according to claim 12 wherein the molar ratio of Zr:Ce in the metal oxide particles is 1:0.5 to 0.5:1.

16. The method according to claim 12 wherein the metal oxide particles have a mean particle diameter of 50 nm or less.

17. The method according to claim 12 wherein the aggregation is achieved by concentrating the solution.

18. The method according to claim 17 wherein the concentrating of the solution is conducted by removing and drying out the solvent.

* * * * *